Patented Sept. 13, 1949

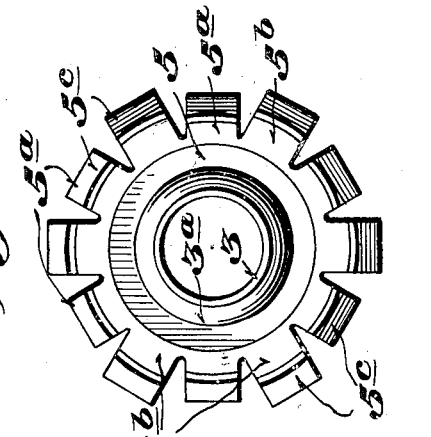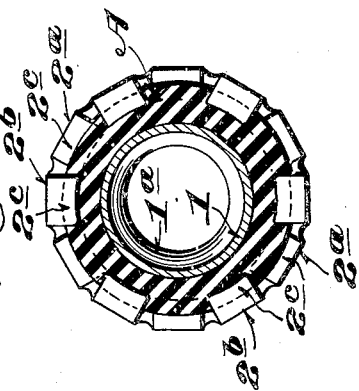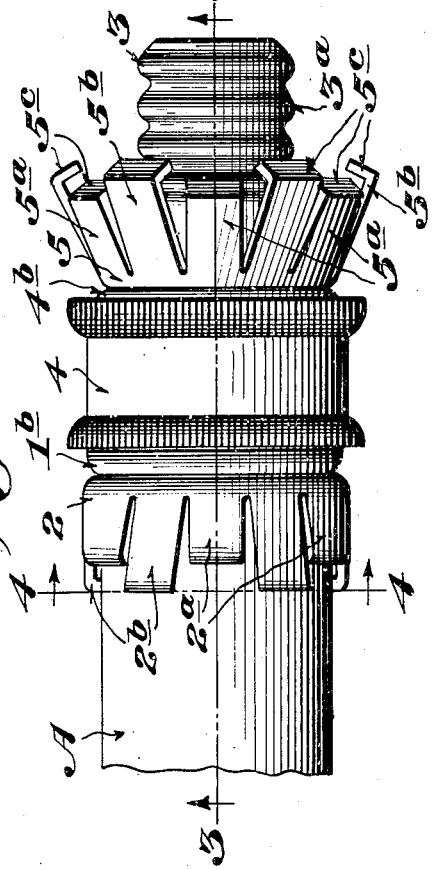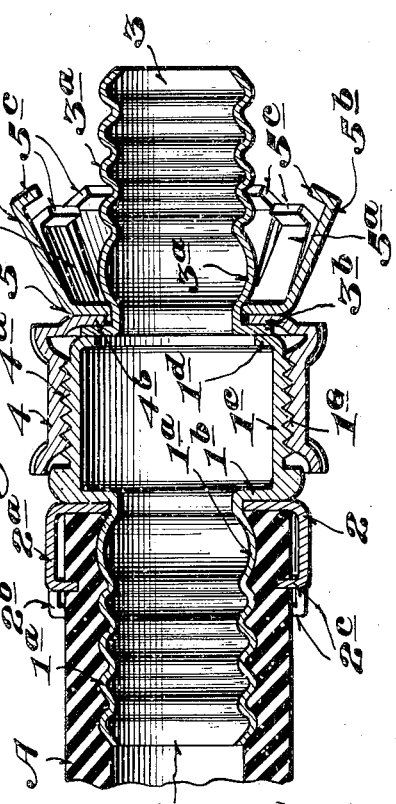

2,481,730

UNITED STATES PATENT OFFICE 2,481,730

HOSE COUPLING

Keith Doerr, Battle Creek, Mich., assignor to H. B. Sherman Manufacturing Co., Battle Creek, Mich., a corporation of Michigan Application August 21, 1945, Serial No. 611,795

2 Claims. (Cl. 285—84)

This invention is a novel improvement in threadedly engaged separable hose couplings or the like of the type consisting of tubular members adapted to be inserted in the bores of rubber or other flexible hose sections, with threaded means for connecting the tubular members together, said tubular members carrying annular claws or clinching fingers having downturned ends adapted to be mashed down into ends of their respective sections to maintain the tubular members positioned therein.

Heretofore such hose couplings have been provided with clinching fingers having downturned ends, but the clinching fingers carried by each tubular member have been of uniform length; and it has thus been found that when these fingers are mashed down upon the hose a substantially continuous annular cut is made entirely around the circumference of the hose which greatly weakens the hose at such point so that the parts may become readily separable by a slight pull on the hose.

The principal object of my present invention is to provide a hose coupling of the same type in which the clinching fingers are made alternately short and long so that their inturned ends will be staggered around the circumference of the hose sections, thereby providing a secure grip between the fingers and the hose and eliminating the possibility of cutting a substantially continuous circular incision around the circumference of the wall of the hose.

Other minor objects of the invention will be hereinafter set forth.

I will explain the invention with reference to the accompanying drawing, which illustrates one practical embodiment thereof, to enable others familiar with the art to adopt and use the same; and will summarize in the claims the novel features of construction, and novel combinations of parts, for which protection is desired.

In said drawing:

Figure 1 is a plan view of my hose coupling, showing a hose section secured to one of the tubular members.

Fig. 2 is an end view of the coupling member shown in Fig. 1.

Fig. 3 is a longitudinal section on the line 3—3, Fig. 1.

Fig. 4 is a transverse section on the line 4—4, Fig. 1.

As shown, the hose coupling consists of a tubular member 1 adapted to fit within the end of the hose section A, same being provided with annular ribs or undulations 1a to frictionally grip the usual interior lining in the bore of the hose. The outer end of coupling 1 is formed with an external annular shoulder 1b substantially normal to the axis of member 1; and beyond flange 1b is an enlarged tubular portion 1c which is exteriorly threaded as at 1e for the reception of the internal threads of the nut 4 carried by the other tubular member 3, hereinafter described.

Preferably the outer end of the enlarged tubular portion 1c is provided with an internal annular flange 1d forming a seat for the washer (not shown) usually provided to make the connection watertight.

Around the member 1 is a clamping claw device comprising a ring 2 of annular shape disposed substantially normal to the axis of the tubular member 1 and confined between the annular shoulder 1b and the outer undulation 1a of member 1, to secure the ring into the position shown in Fig. 3. Ring 2 is provided on its periphery with an annular series of clinching fingers 2a and 2b, which fingers are normally disposed at an angle of about 45° to the axis of the tubular member 1, but as shown in Figs. 1, 2 and 3, the same may be mashed down substantially parallel with the axis of tubular member 1 so that their inturned ends 2c will cut into, or engage or grip, the outer surface of the hose section A.

As shown, the clinching fingers 2a are shorter than the alternate fingers 2b, so that when mashed down as above described the inturned ends 2c will be staggered around the circumference of the hose A, thereby eliminating the possibility of forming a substantially continuous cut all the way through the circumference of the hose as is the case where the fingers are all of the same length. Thus the provision of alternately short and long fingers 2a and 2b respectively will give a more secure grip by the fingers on the hose, and since the inturned ends 2c are staggered around the circumference of the hose, the possibility of forming a continuous cut around the hose, which would materially weaken the same, is thereby eliminated.

The other member of the coupling comprises a similar tubular member 3 adapted to fit within the end of the adjacent hose section, the same being provided with annular ribs or undulations 3a similar to and for the same purpose as the undulations 1a. The outer end of member 3 is outturned as at 3b to form an external annular shoulder; and rotatably mounted upon the tubular member 3 is a nut 4 having internal threads 4a adapted to engage the external threads 1e of the tubular enlargement 1c of member 1, as clearly shown, said nut 4 having an inwardly extending flange 4b of somewhat larger diameter than the major diameter of the tubular member 3, said flange seating against the outturned flange 3b at the outer end of tubular member 3, whereby the nut 4 may be freely rotated upon the member 3 but the flange 3b of member 3 may not be withdrawn through the annular flange 4b of nut 4. In use, an annular packing washer (not shown) would be positioned between the flange 1d of tubular portion 1c of member 1, and the outturned flange 3b of the tubular member 3, to render the connection watertight.

Member 3 is similarly provided with an annular clamping claw device comprising an annular ring 5 confined between the flange 4b of nut 4 and the outer undulation 3a of the tubular member 3, the flange 4b being sufficiently loosely confined between the ring 5 and flange 3b to permit ready rotation of the nut 4 on the member 3. Ring 5 is also provided with alternating short clinching fingers 5a and long clinching fingers 5b, each finger having an inturned end 5c; and normally the fingers 5a and 5b would be disposed at an angle of substantially 45° to the axis of the member 3 so that the hose section to be connected may be inserted over the tubular member 3 and under the ends 5c of fingers 5a, 5b after which the fingers may be mashed down in the same manner as shown in Fig. 1 so as to lie substantially parallel with the axis of the tubular member 3. In such position the inturned ends 5c of the fingers 5a, 5b, would be staggered around the circumference of the hose in the same manner as the fingers 2a, 2b are staggered around the hose section A, thereby giving more secure grip between the fingers and hose and eliminating the possibility of forming a substantially continuous circular cut completely around the periphery of the respective hose section.

The tubular member 3, with the nut 4 and clamping device 5, may separately be used to connect a hose section with a faucet, or the like, while tubular member 1 with its clamping device 2 may be separately used to connect a hose section to a threaded nozzle, or the like, if desired.

I do not limit my invention to the exact form shown in the drawing, for obviously changes may be made therein within the scope of the claims.

I claim:

1. In a hose coupling or the like, a tubular member adapted to enter the bore in the end of a hose section; and a clamping claw device fixedly mounted on said tubular member, said clamping claw device comprising an annular base plate overlying the end of the hose and disposed substantially normal to the axis of said tubular member, said base plate having two annular alternating series of clinching fingers, said fingers of one series being short, while the fingers of the other series are of greater length, each series having ends adapted to grip the outer wall of the hose against said tubular member when the fingers are mashed substantially parallel with the axis of said tubular member, said tubular member extending into said hose section beyond the ends of said fingers to provide a support for a strong and positive grip of said fingers on said hose.

2. A separable hose coupling, comprising a pair of tubular members adapted to enter the bores in adajcent ends of hose sections respectively; threaded joining means for maintaining said tubular members in axial alignment; and a single clamping claw device fixedly mounted on each of said tubular members adjacent their outer ends, each clamping claw device comprising an annular base plate disposed substantially normal to the axis of the related tubular member and having an annular series of clinching fingers, said fingers being alternately short and long and having ends adapted to grip the outer wall of the related hose section against the side of said tubular member when the fingers are mashed down side by side substantially parallel with the axis of the related tubular member, said tubular member extending into said hose section beyond the ends of said fingers to provide a positive support for a strong grip of said fingers on said hose.

KEITH DOERR.

REFERENCES CITED

The following references are of record in the file of this patent:

UNITED STATES PATENTS

| Number | Name | Date |
|---|---|---|
| 1,919,860 | Reutter | July 25, 1933 |
| 1,965,426 | Nelson | July 13, 1934 |

FOREIGN PATENTS

| Number | Country | Date |
|---|---|---|
| 248,162 | Great Britain | Mar. 4, 1926 |